(12) United States Patent
Xue et al.

(10) Patent No.: US 11,974,255 B2
(45) Date of Patent: Apr. 30, 2024

(54) INDEX FOR MULTIPLE BITS ON A SIDELINK FEEDBACK CHANNEL

(71) Applicant: QUALCOMM Incorporated, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/303,196

(22) Filed: May 24, 2021

(65) Prior Publication Data

US 2022/0377704 A1 Nov. 24, 2022

(51) Int. Cl.
*H04W 72/02* (2009.01)
*H04L 1/1812* (2023.01)
*H04L 1/1867* (2023.01)
*H04W 72/20* (2023.01)

(52) U.S. Cl.
CPC ........... *H04W 72/02* (2013.01); *H04L 1/1819* (2013.01); *H04L 1/1896* (2013.01); *H04W 72/20* (2023.01)

(58) Field of Classification Search
CPC ...... H04W 72/02; H04W 72/20; H04L 1/1819
See application file for complete search history.

(56) References Cited

U.S. PATENT DOCUMENTS

| 2011/0246840 | A1 | 10/2011 | Khoshnevis et al. | |
|---|---|---|---|---|
| 2014/0245095 | A1* | 8/2014 | Nammi | H04L 5/0055 714/749 |
| 2018/0123767 | A1* | 5/2018 | Islam | H04L 1/1816 |
| 2019/0110217 | A1* | 4/2019 | Nam | H04L 5/0053 |
| 2020/0163103 | A1* | 5/2020 | Kuang | H04W 72/1257 |
| 2020/0229173 | A1* | 7/2020 | Cao | H04W 28/26 |
| 2020/0280985 | A1* | 9/2020 | Ijaz | H04W 72/0453 |
| 2020/0351033 | A1* | 11/2020 | Ryu | H04W 72/0453 |
| 2022/0078782 | A1* | 3/2022 | Zhao | H04W 72/0446 |
| 2022/0167340 | A1* | 5/2022 | Ji | H04L 1/1861 |

FOREIGN PATENT DOCUMENTS

CN  111970094 A  11/2020

OTHER PUBLICATIONS

Garcia M.H.C., et al., "A Tutorial on 5G NR V2X Communications", in IEEE Communications Surveys and Tutorials, vol. 23, No. 3, Third Quarter, Arxiv.Org, Cornell University Library, 201 Olin Library Cornell University, Ithaca, NY 14853, Feb. 8, 2021, XP081877162, 55 Pages, p. 18- p. 21, figures 8, 10, 14, sections V.A.1), V.B, V.B.5), V.C.6), VI.B, VII.C, VIII.B.
International Search Report and Written Opinion—PCT/US2022/072498—ISA/EPO—dated Sep. 6, 2022.

* cited by examiner

*Primary Examiner* — Won Tae C Kim

(74) *Attorney, Agent, or Firm* — Harrity & Harrity, LLP

(57) ABSTRACT

Various aspects of the present disclosure generally relate to wireless communication. In some aspects, a first user equipment (UE) may receive a communication from a second UE. The first UE may select an index that represents multiple control bits associated with the communication. The first UE may transmit an indication of the index in a portion of a physical sidelink feedback channel (PSFCH) resource pool that is selected based at least in part on the index. Numerous other aspects are described.

29 Claims, 13 Drawing Sheets

INDEX FOR MULTIPLE BITS ON A SIDELINK FEEDBACK CHANNEL

FIELD OF THE DISCLOSURE

Aspects of the present disclosure generally relate to wireless communication and to techniques and apparatuses for using an index on a sidelink feedback channel to indicate multiple bits.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving a communication from a second UE and selecting an index that represents multiple control bits associated with the communication. The method may include transmitting an indication of the index in a portion of a physical sidelink feedback channel (PSFCH) resource pool that is selected based at least in part on the index.

In some aspects, a method of wireless communication performed by a first UE includes transmitting a communication to a second UE and receiving, from the second UE in a portion of a PSFCH resource pool, an indication of an index. The method may include identifying multiple control bits that are associated with the communication based at least in part on the index.

In some aspects, a first UE for wireless communication includes a memory and one or more processors, coupled to the memory, configured to receive a communication from a second UE, select an index that represents multiple control bits associated with the communication, and transmit an indication of the index in a portion of a PSFCH resource pool that is selected based at least in part on the index.

In some aspects, a first UE for wireless communication includes a memory and one or more processors, coupled to the memory, configured to transmit a communication to a second UE, receive, from the second UE in a portion of a PSFCH resource pool, an indication of an index, and identify multiple control bits that are associated with the communication based at least in part on the index.

In some aspects, a non-transitory computer-readable medium storing a set of instructions for wireless communication includes one or more instructions that, when executed by one or more processors of a first UE, cause the UE to receive a communication from a second UE, select an index that represents multiple control bits associated with the communication, and transmit an indication of the index in a portion of a PSFCH resource pool that is selected based at least in part on the index.

In some aspects, a non-transitory computer-readable medium storing a set of instructions for wireless communication includes one or more instructions that, when executed by one or more processors of a UE, cause the UE to transmit a communication to a second UE, receive, from the second UE in a portion of a PSFCH resource pool, an indication of an index, and identify multiple control bits that are associated with the communication based at least in part on the index.

In some aspects, an apparatus for wireless communication includes means for receiving a communication from another apparatus, means for selecting an index that represents multiple control bits associated with the communication, and means for transmitting an indication of the index in a portion of a PSFCH resource pool that is selected based at least in part on the index.

In some aspects, an apparatus for wireless communication includes means for transmitting a communication to another apparatus, means for receiving, from the other apparatus in a portion of a PSFCH resource pool, an indication of an index, and means for identifying multiple control bits that are associated with the communication based at least in part on the index.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
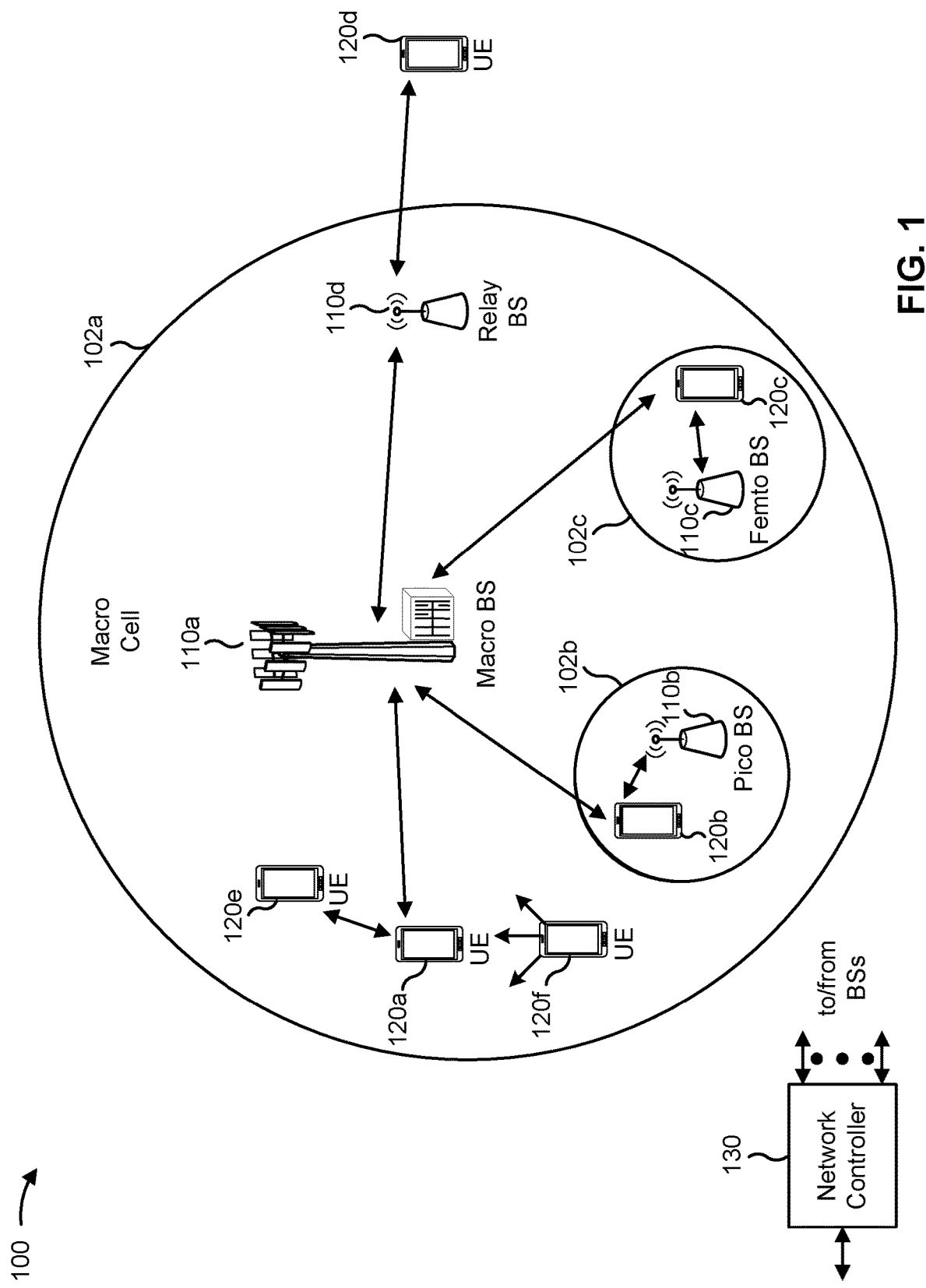
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs)

and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I), or a vehicle-to-pedestrian (V2P) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive a communication from a second UE, select an index that represents multiple control bits associated with the communication, and transmit an indication of the index in a portion of a physical sidelink feedback channel (PSFCH) resource pool that is selected based at least in part on the index. Additionally, or alternatively, the communication manager 140 may perform one or more other operations described herein.

In some aspects, the UE 120 may include a communication manager 140. As described in more detail elsewhere herein, the communication manager 140 may transmit a communication to a second UE, receive, from the second UE in a portion of a PSFCH resource pool, an indication of an index, and identify multiple control bits that are associated with the communication based at least in part on the index. Additionally, or alternatively, the communication manager 140 may perform one or more other operations described herein.

As indicated above, FIG. 1 is provided as an example. Other examples may differ from what is described with regard to FIG. 1.

Figure 2:
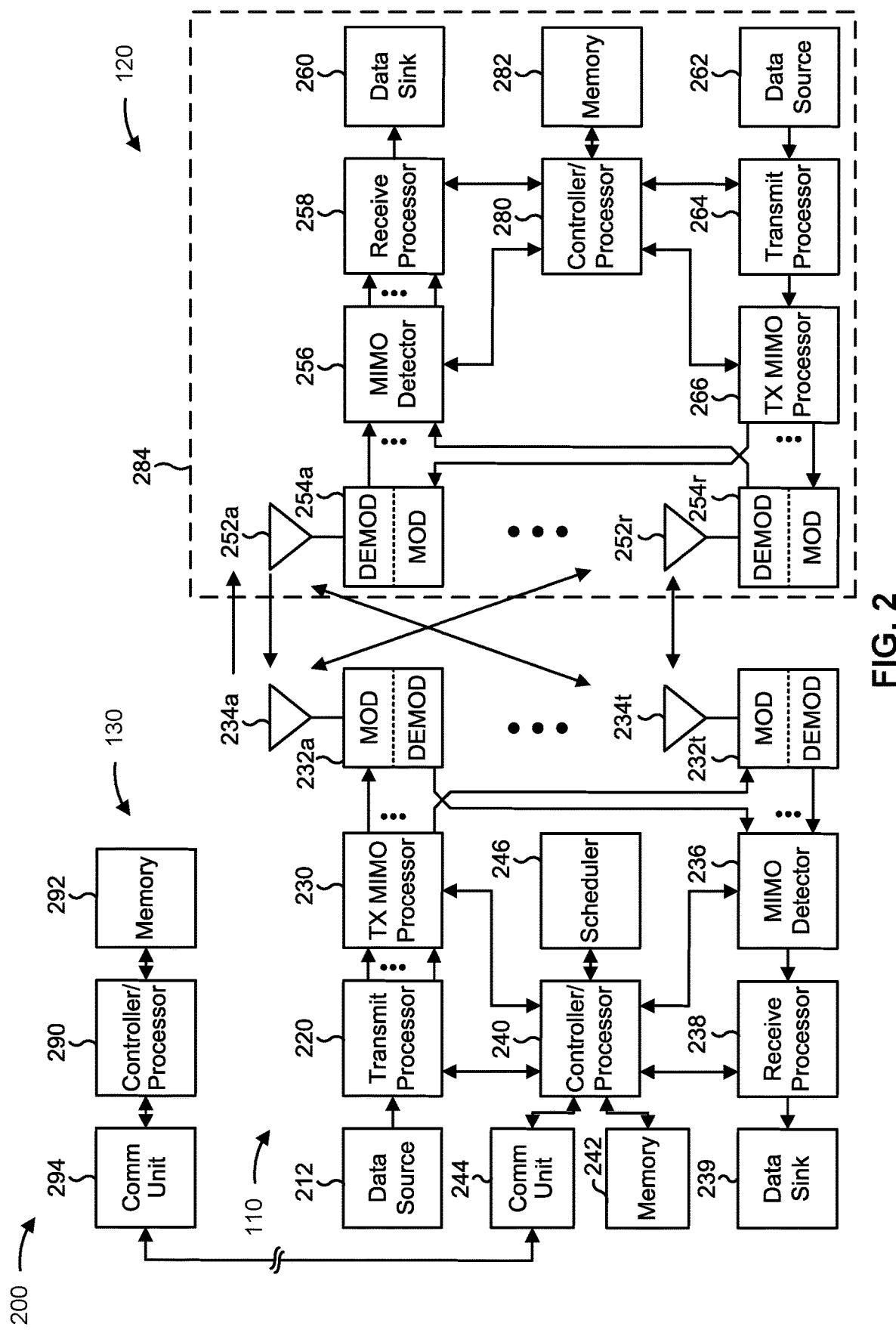
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-13).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-13).

Controller/processor 240 of base station 110, controller/processor 280 of UE 120, and/or any other component(s) of FIG. 2 may perform one or more techniques associated with using an index to indicate multiple control bits on a PSFCH, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, a first UE (e.g., UE 120) includes means for receiving a communication from a second UE, means for selecting an index that represents multiple control bits associated with the communication, and/or means for transmitting an indication of the index in a portion of a PSFCH resource pool that is selected based at least in part on the index. The means for the first UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a first UE (e.g., UE 120) includes means for transmitting a communication to a second UE, means for receiving, from the second UE in a portion of a PSFCH resource pool, an indication of an index, and/or means for identifying multiple control bits that are associated with the communication based at least in part on the index. The means for the first UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
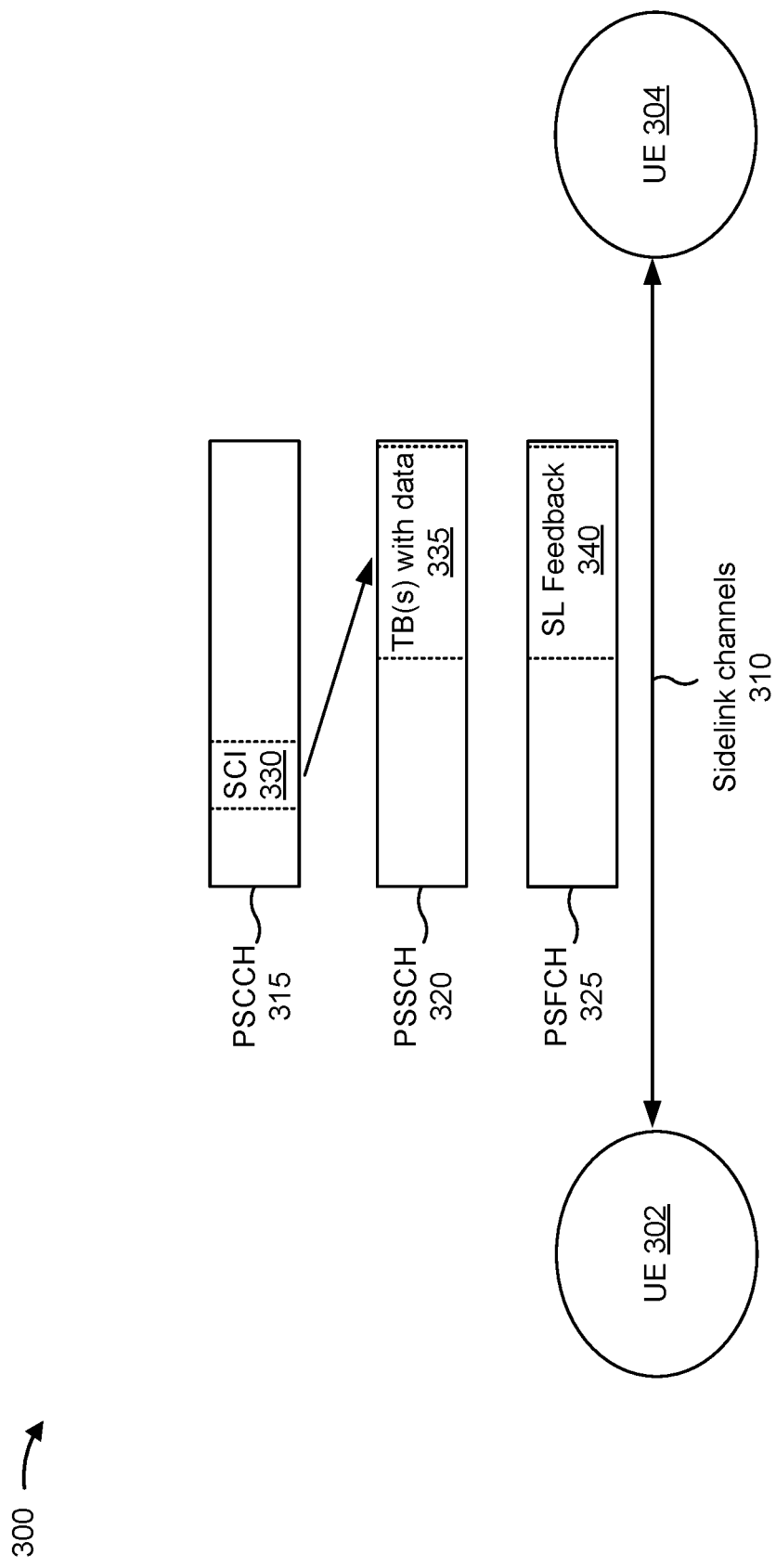
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 302 may communicate with a second UE 304 (and one or more other UEs) via one or more sidelink channels 310. UE 302 and UE 304 may communicate using the one or more sidelink channels 310 for P2P communications, D2D communications, V2X communications (e.g., which may include V2V communications, V2I communications, and/or V2P communications) and/or mesh networking. In some aspects, UE 302 and UE 304 may correspond to one or more other UEs. In some aspects, the one or more sidelink channels 310 may use a PC5 interface and/or may operate in a high frequency band (e.g., the 5.9 gigahertz (GHz) band or higher). Additionally, or alternatively, UE 302 and UE 304 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station (e.g., base station 110) via an access link or an access channel. The PSSCH 320 may be used to communicate data, similar to a physical downlink shared channel (PDSCH) and/or a physical uplink shared channel (PUSCH) used for cellular communications with a base station via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data, and SCI is usually transmitted with data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR). UE 304 may transmit a request in SCI for a HARQ response.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, UE 304 may operate using a transmission mode where resource selection and/or scheduling is performed by UE 302 (e.g., rather than a base station). In some aspects, UE 302 and/or UE 304 may perform resource selection and/or scheduling by sensing channel availability for transmissions. For example, UE 304 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or may determine a signal-to-interference ratio (SIR) associated with another UE on a sidelink channel. UE 304 may select a channel for transmission of a sidelink communication based at least in part on the measurement(s).

Additionally, or alternatively, UE 304 may perform resource selection and/or scheduling using SCI 330 received in the PSCCH 315, which may indicate occupied resources and/or channel parameters. Additionally, or alternatively, UE 304 may perform resource selection and/or scheduling by determining a channel busy ratio (CBR) associated with various sidelink channels, which may be used for rate control (e.g., by indicating a maximum number of resource blocks that UE 304 can use for a particular set of subframes).

In the transmission mode where resource selection and/or scheduling is performed by UE 302, UE 302 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, UE 302 may generate a sidelink grant that indicates one or more parameters for semi-persistent scheduling (SPS), such as a periodicity of a sidelink transmission. Additionally, or alternatively, UE 302 may generate a sidelink grant for event-driven scheduling, such as for an on-demand sidelink message.

UE 302 and UE 304 may operate in sidelink resource allocation Mode 2, in which UE 302 and UE 304 schedule or reserve their own sidelink resources without the assistance or direction of a base station (Mode 1). In some aspects, UE 302 may indicate available sidelink resources to UE 304, and UE 304 may select a sidelink resource for transmission from these available sidelink resources. UE 304 may also sense one or more of the sidelink channels 310 to determine which sidelink resources are available. UE 304 may select a sidelink resource for transmission from the sidelink resources that UE 302 indicates as available and/or from the sidelink resources that UE 304 senses are available. In some aspects, UE 302 may schedule one or more preferred sidelink resources on behalf of UE 304.

As indicated above, FIG. 3 is provided as an example. Other examples may differ from what is described with regard to FIG. 3.

Figure 4:
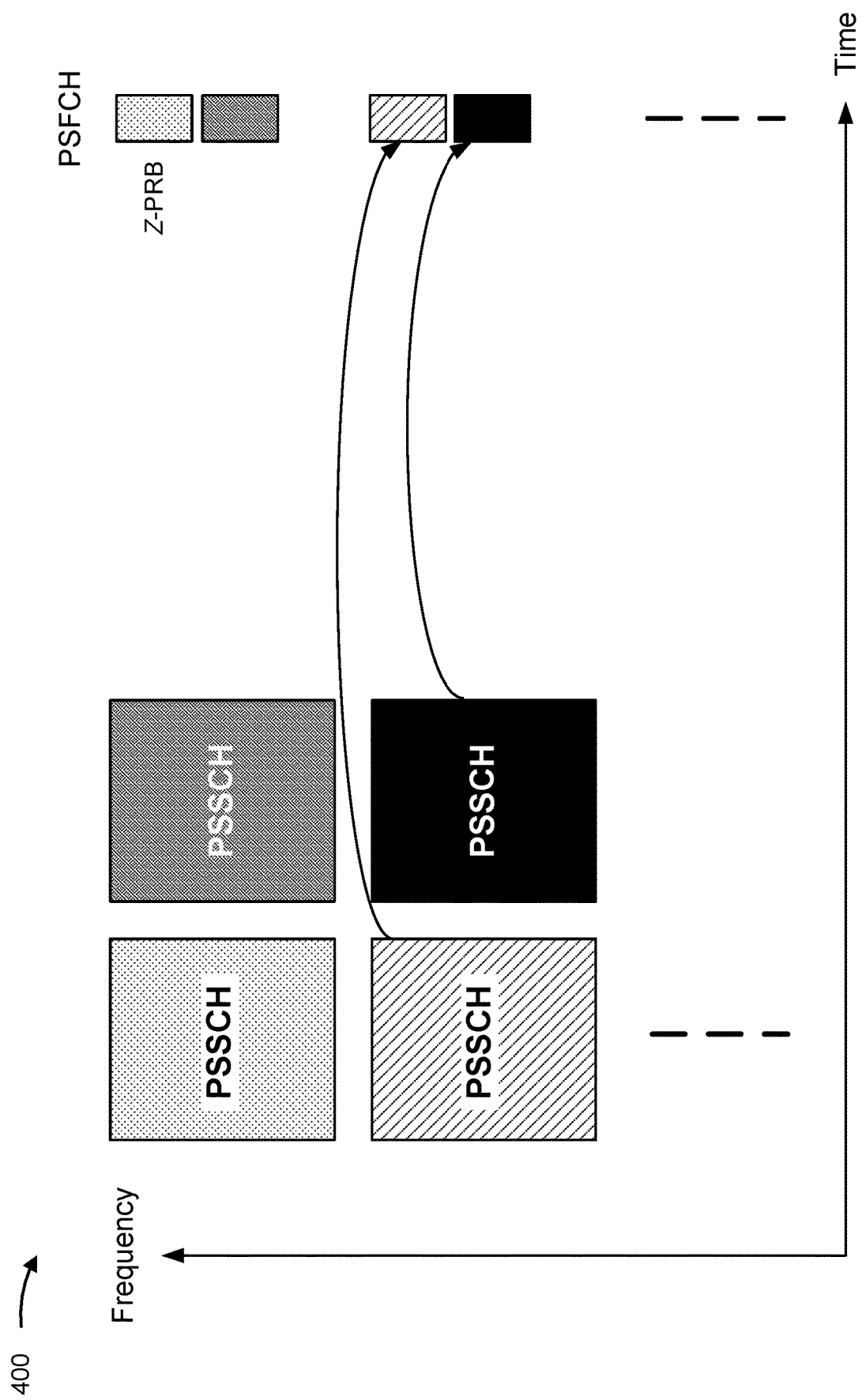
FIG. 4 is a diagram illustrating an example of mapping channels or sub-channels to physical resource blocks (PRBs), in accordance with the present disclosure.

FIG. 4 is a diagram illustrating an example 400 of mapping channels or sub-channels to physical resource blocks (PRBs), in accordance with the present disclosure.

A transmitting UE may map sub-channels or PSSCHs to PRBs on the PSFCH. Each PRB may be referred to as a Z-PRB, where Z identifies the PRB from among other PRBs. A Z-PRB may include Y cyclic shifts (CSs) in a code domain (e.g., 1, 2, 3, 4, 6). Each CS may be considered a portion of the Z-PRB. In other words, a communication on the PSSCH may be mapped to one of Z*YPSFCH resources. The receiving UE may select a PSFCH resource with an index of $(K+M) \bmod(Z^*Y)$ for transmitting the communication over one of the Z-PRBs, where K is an 8-bit layer 1 (L1) source identifier (ID) and M is set to a member ID for groupcast HARQ response option 2 (option 2 involves a respective response for different receivers). The member ID may be within $\{0, 1, \ldots X-1\}$, and groupcast HARQ response option 2 is not used when X is greater than $(Z^*Y)$. M is to be 0 otherwise. A first Z-PRB may correspond to a leading subchannel of the PSSCH.

Wireless communications may be used to serve different industries or services. Each of these industries or services may be considered a vertical domain. Public safety and vehicle-to-vehicle services may be examples of vertical domains that may use NR sidelink channels. NR sidelink may also be used for other vertical domains. However, not every vertical domain has access to a sub-6 GHz licensed band and may seek access in unlicensed bands. There may be about 1.8 GHz available in the 5 GHz/6 GHz unlicensed band and about 7 GHz in the 60 GHz unlicensed band. Wider bandwidths can create various deployment challenges. First, such challenges may include burst traffic instead of sporadic small packets, leading to a burst of HARQ responses. Second, wideband deployment via carrier aggregation may prefer control information over a primary carrier. Third, there may be fewer successful channel accesses in unlicensed band due to listen-before-talk (LBT). Fourth, there may also be light and prompt signaling to facilitate a star topology between a hub UE and peripheral UEs. However, UEs currently only use 1 bit of control signaling on the PSFCH per channel access. For example, a 1-bit HARQ response is carried by a computer-generated sequence (CGS) whose index is obtained from a hashing space with size Z*Y (large hashing space helps to suppress PSFCH collisions). The 1-bit HARQ response is sent without a grant in Mode 1 nor sensing in Mode 2. Without the ability to transmit more control information, deployment challenges may introduce latencies and cause UEs to consume more processing resources and signaling resources than is necessary.

As indicated above, FIG. 4 is provided as an example. Other examples may differ from what is described with regard to FIG. 4.

Figure 5:
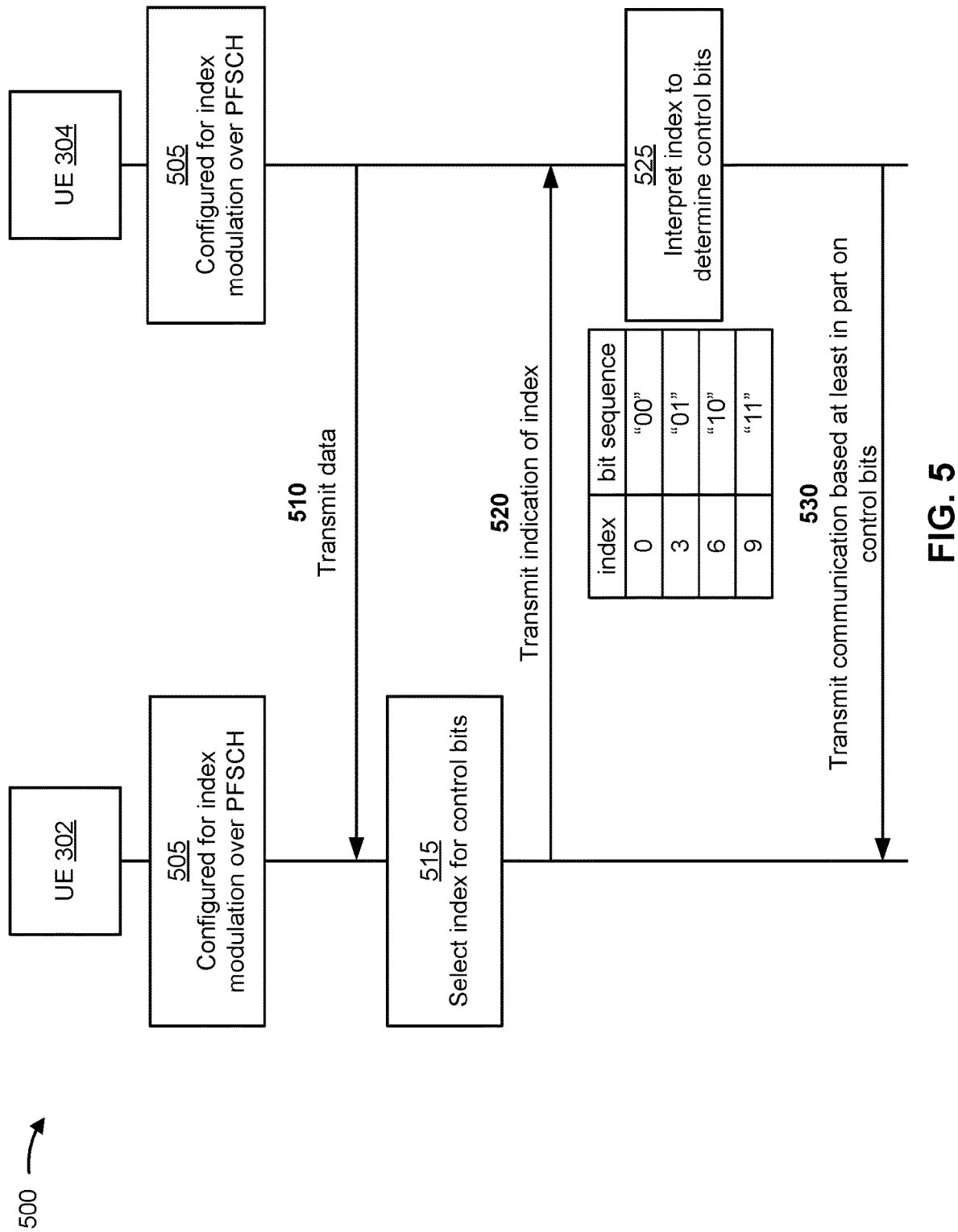
FIG. 5 is a diagram illustrating an example of using index modulation for transmitting control information over the physical sidelink feedback channel, in accordance with the present disclosure.

FIG. 5 is a diagram illustrating an example 500 of using index modulation for transmitting control information over the PSFCH, in accordance with the present disclosure. Example 500 shows that UE 302 and UE 304 may communicate with one another over sidelink channels. UE 302 and UE 304 operate within a wireless network, such as wireless network 100. UE 304 may be a UE that transmits data on the PSSCH. UE 302 may be a UE that receives data on the PSSCH and transmits feedback on the PSFCH. UE 304 may receive the feedback.

According to various aspects described herein, UEs may use index modulation to convey more than 1 bit of control information on the PSFCH. Index modulation may include indicating an index that is pre-mapped to multiple control bits. For example, an index of 0 may represent control bits "00" and an index of 3 may represent control bits "01". The index values may be contiguous, non-contiguous, or may correspond to mod(Z*Y). For example, if mod(Z*Y)=0, the index modulated bit sequence may be "00 . . . 00". If mod(Z*Y)=1, the index modulated bit sequence may be "00 . . . 01". If mod(Z*Y)=Z*Y−1, the index modulated bit sequence may be "11 . . . 11". While a PRB has been used by PUCCH format 0 to carry up to 3 bits with carefully chosen CSs, with index modulation, UE 302 may use index-modulated PSFCH to carry more bits (e.g., 3+[$\log_2$(Z)] bits). Encoding and decoding can be conducted under a current PSFCH framework.

By using an index that represents multiple control bits, UE 302 may convey more control information. For example, instead of transmitting a single HARQ bit on the PSFCH, UE 302 may transmit an index value that corresponds to a HARQ codeword. The multiple control bits may also represent multiple types of control information (e.g., CQI, delta CQI, scheduling request) that are multiplexed together.

UE 302 may apply two-dimensional (frequency domain via PRB index and code domain via CS index) index modulation to deliver the multiple control bits. Prior to the use of index modulation, UE 302 may have selected an index of a PSFCH resource for transmission based on (K+M)mod(Z*Y), which was also used to determine respective bit sequences for acknowledgement (ACK) and negative acknowledgement (NACK). UE 302 may have used three-hypothesis detection to determine what is received among ACK, NACK, or discontinuous transmission (DTX). Using more than 3 hypotheses may consume a moderate amount of processing resources since PSFCH detection can be performed with simple frequency domain correlation.

UE 302 may transmit the index in a portion of a PRB on the PSFCH that avoids collision in the time and frequency domains with bits from another UE on the channel. For example, if a specified pool of PSFCH resources includes Z'-PRBs and Y'-CS per PRB, UE 302 may select the PSFCH resource (portion of a PRB) whose index is (K'+l)mod(Z'*Y'), where l is the index and K' is the 8-bit L1 ID of the PSFCH receiver or a constellation offset. PSFCH collisions may happen when more than two transmitting UEs are transmitting over the same sub-channel and the UEs have spreads around the L1 ID that collide in the hashing space. The spread may be equal to the member size for groupcast HARQ response option 2, or to 1 otherwise. Applying index modulation to unicast does not increase the spread and thus there are no additional PSFCH collisions. In addition, the UEs may use more bits per channel access.

Example 500 shows index modulation for conveying control information on the PSFCH. As shown by reference number 505, UE 302 and UE 304 may be configured for index modulation over the PSFCH. For example, UE 302 and UE 304 may both store a layer 3 (L3) table of indices that are mapped to bit sequences.

As shown by reference number 510, UE 304 may transmit data to UE 302. UE 302 may prepare feedback (e.g., HARQ codeword) for the received data. As shown by reference number 515, UE 302 may select an index that maps to multiple control bits that identifies the feedback. As shown by reference number 520, UE 302 may transmit an indication of the index to UE 304.

In some aspects, UE 304 may dynamically trigger or poll transmission of the index with trigger SCI. The trigger SCI may indicate which set of control information is requested (and a corresponding value of n for the quantity of bits). Examples of control information may include a HARQ codebook, a scheduling request (SR) used for UE-to-UE scheduling over sidelink, a low-bit buffer status report (BSR), a rank indicator (RI), CQI, delta CQI, an LBT failure, or any combination thereof. The trigger SCI may also specify K' to be a value that is different from the 8-bit L1 ID of the PSFCH receiver. This provides another degree of freedom for PSFCH collision avoidance over the fixed 8-bit L1 ID in legacy procedures. In some aspects, UE 304 may transmit the trigger SCI without requesting a HARQ response for a co-located PSSCH. For example, UE 304 may transmit SCI to request a combination of any of the control information listed herein, except for a HARQ response.

As shown by reference number 525, UE 304 may interpret the index as multiple control bits. For example, UE 304 may look up the index in the stored table to identify the multiple control bits and determine what control information is being conveyed. UE 304 may use the control information. As shown by reference number 530, UE 304 may transmit a communication to UE 302 using the control information. The communication may be a retransmission or new data based at least in part on HARQ feedback indicated by the index.

As indicated above, FIG. 5 is provided as an example. Other examples may differ from what is described with regard to FIG. 5.

Figure 6:
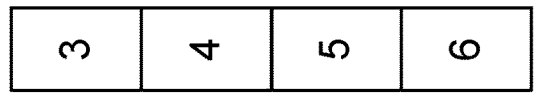
FIG. 6 is a diagram illustrating an example of resource pools, in accordance with the present disclosure.
Figure 6:
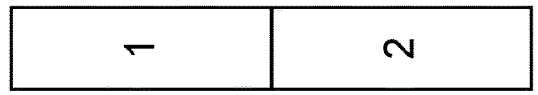
Figure 6:
Figure 6:
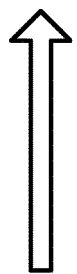
Figure 6:
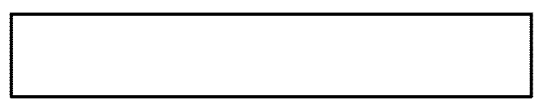

FIG. 6 is a diagram illustrating an example 600 of resource pools, in accordance with the present disclosure. Example 600 shows resource pools within PSFCH resources indicated by Z*Y. A resource pool may include one or more portions of a PRB. The trigger SCI described in connection with FIG. 5 may specify a pool of resources for index-modulated PSFCH as a subset of the PSFCH resources indicated by Z*Y. Example 600 shows 7 possible portions (e.g., 0-6) of the PSFCH resources that are partitioned from the Z*YPSFCH resources. UE 302 may use partitioned portions of the PSFCH resources to transmit an index and to avoid PSFCH collisions. UE 304 may indicate in the trigger SCI which index to use and/or which sub-pool of PSFCH resources to use.

As indicated above, FIG. 6 is provided as an example. Other examples may differ from what is described with regard to FIG. 6.

Figure 7:
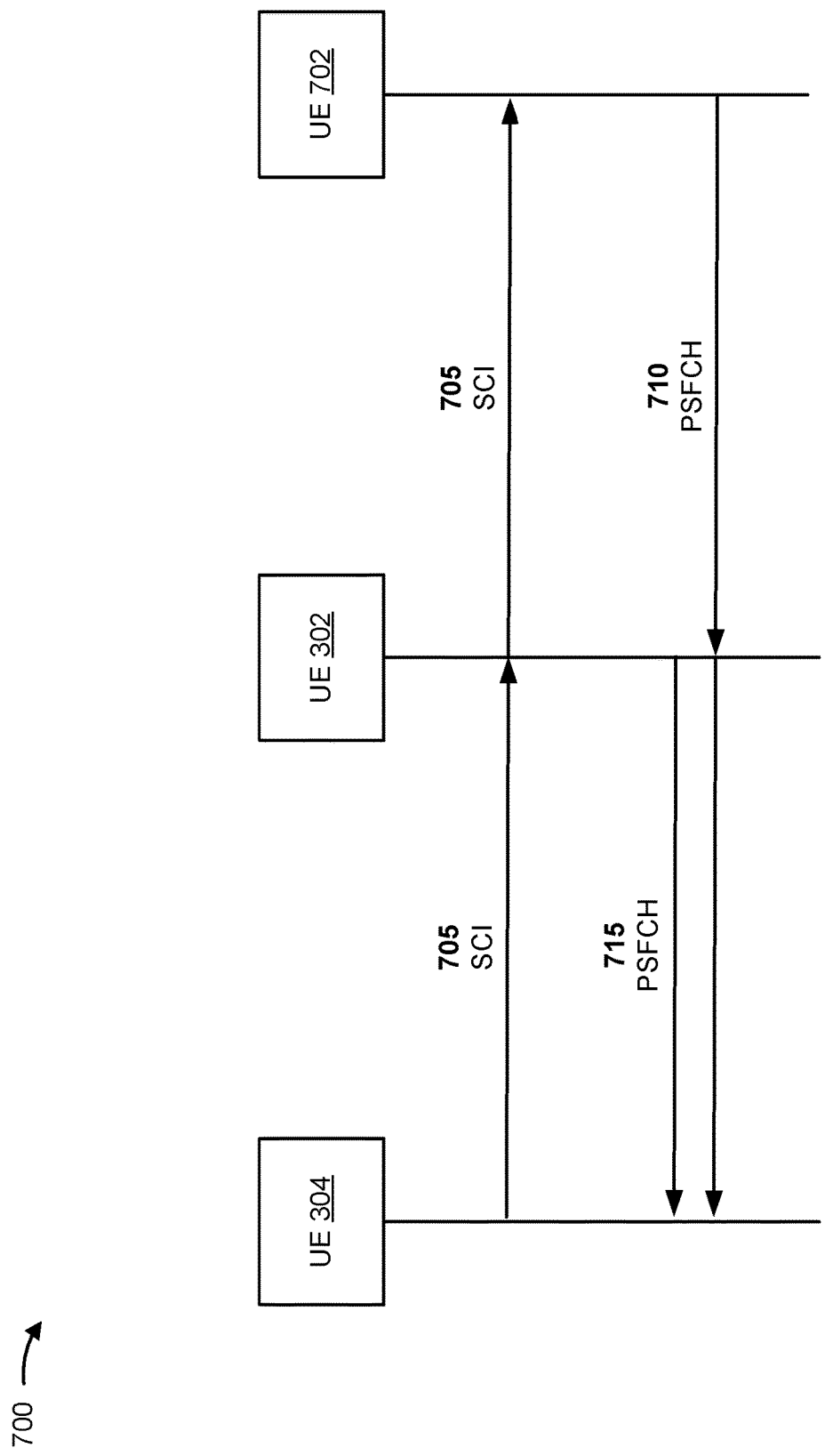
FIG. 7 is a diagram illustrating an example of transmitting trigger sidelink control information to multiple UEs, in accordance with the present disclosure.

FIG. 7 is a diagram illustrating an example 700 of transmitting trigger SCI to multiple UEs, in accordance with the present disclosure. Example 700 shows another UE 702, in addition to UE 302 and UE 304.

As shown by reference number 705, UE 304 may transmit trigger SCI (or respective trigger SCIs) to multiple UEs, including to UE 302 and UE 702. The trigger SCI may request index modulated multiple bit control over the same Z-PRB of PSFCH resources. UE 302 may assign orthogonal sub-pools of PSFCH resources in order to avoid time-frequency domain collisions. For example, UE 302 may assign a first sub-pool and a second sub-pool, such as shown in FIG. 6. The trigger SCI may also assign different K' values to the multiple UEs, in order to avoid time-frequency collisions. As shown by reference numbers 710 and 715, UE 702 may transmit an indication of an index on the PSFCH in the first sub-pool and UE 302 may transmit an indication of an index on the second sub-pool.

As indicated above, FIG. 7 is provided as an example. Other examples may differ from what is described with regard to FIG. 7.

Figure 8:
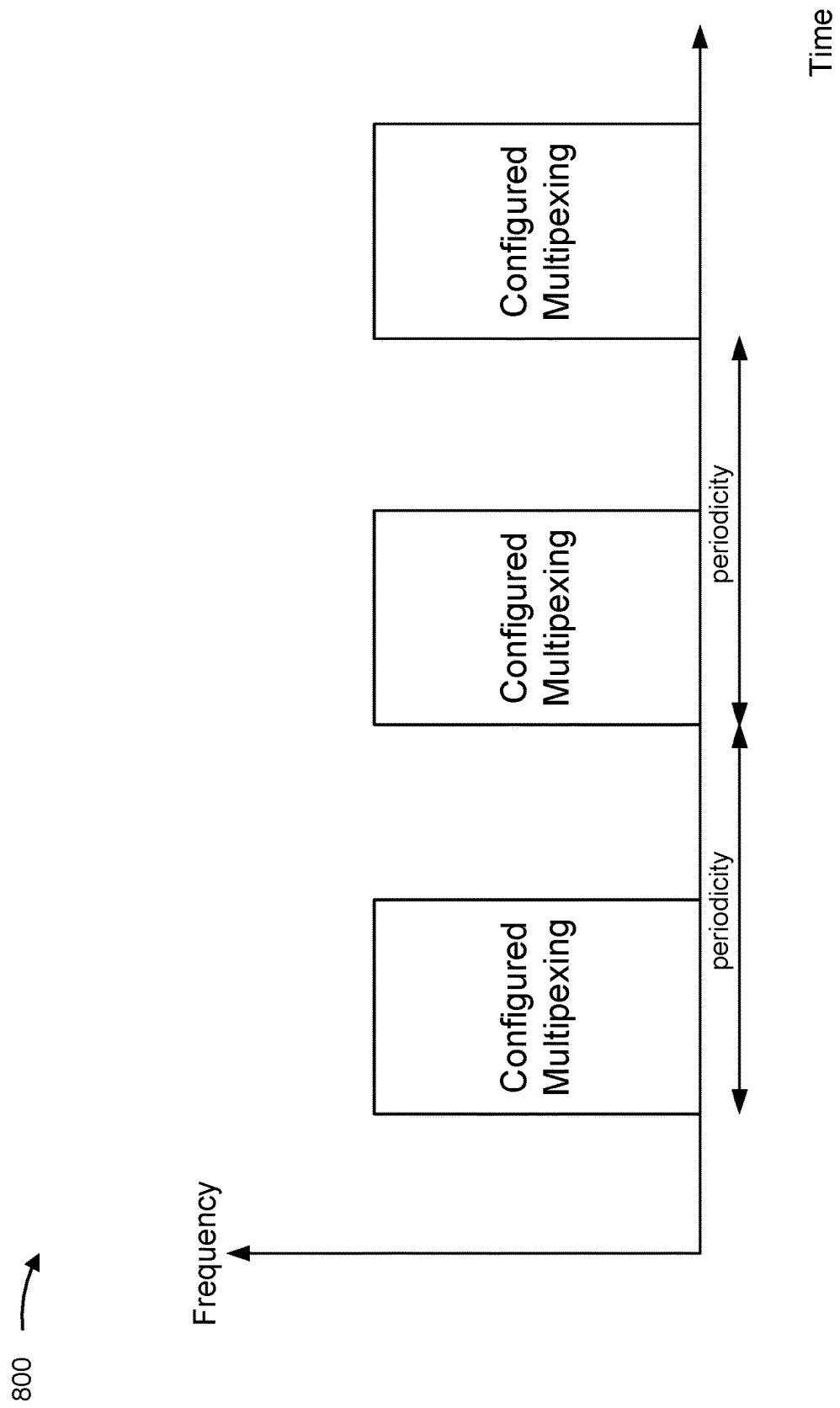
FIG. 8 is a diagram illustrating an example of transmitting control information according to a time pattern, in accordance with the present disclosure.

FIG. 8 is a diagram illustrating an example 800 of transmitting control information according to a time pattern, in accordance with the present disclosure.

In some aspects, UE 302 may transmit indices for index modulation according to a pattern, such as a time pattern. The time pattern may be preconfigured between UE 302 and UE 304 via L3 or PC5 radio resource control (RRC) signaling. For example, UE 302 and UE 304 may agree to have an SR and a HARQ response (toward a unicast PSSCH) multiplexed at periodic time windows. The periodic time windows may be defined with respect to a direct frame number. At any instant within a time window, UE 302 may transmit an index that corresponds to a multi-bit sequence. UE 304 may perform detection over multiple hypotheses, such as over 5 hypotheses (including DTX).

As indicated above, FIG. 8 is provided as an example. Other examples may differ from what is described with regard to FIG. 8.

Figure 9:
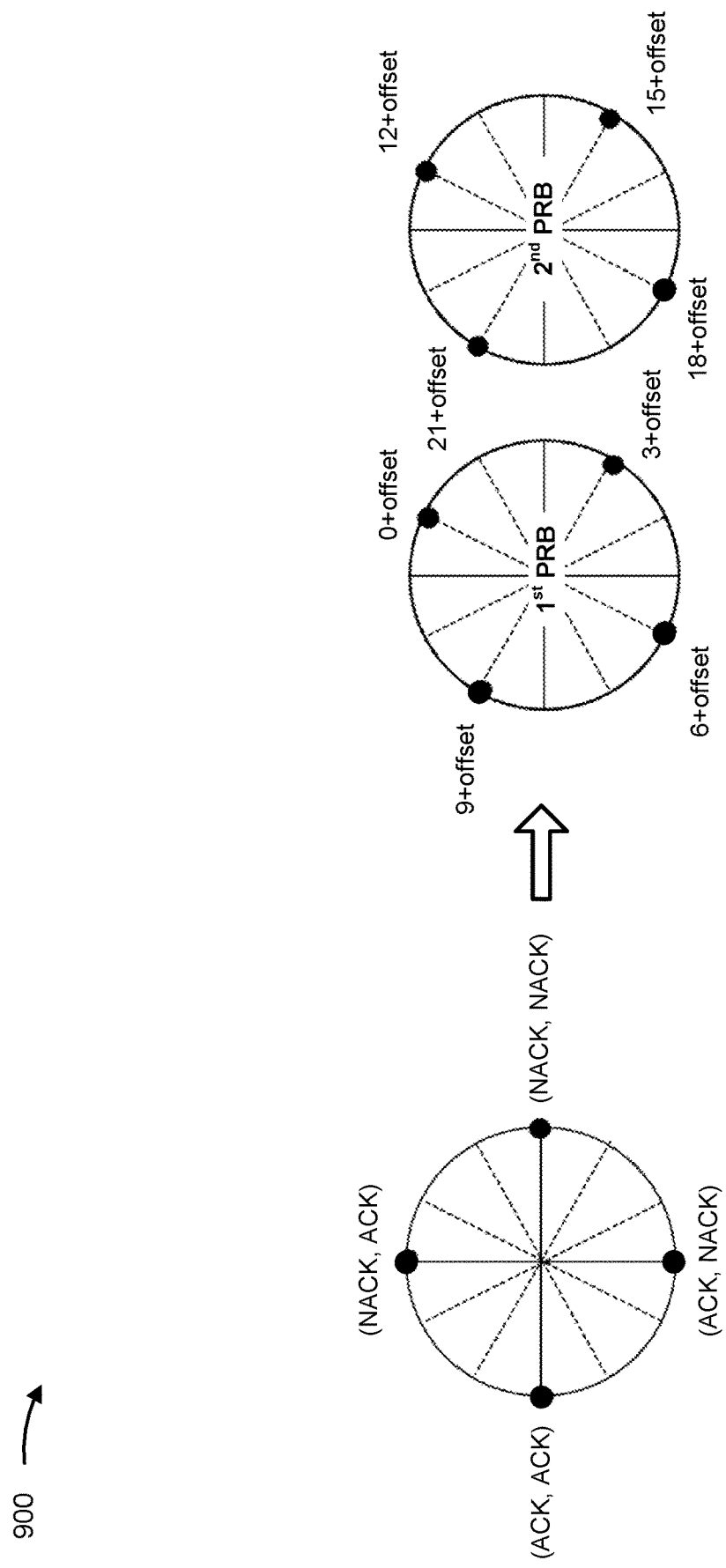
FIG. 9 is a diagram illustrating an example of using PRB portions, in accordance with the present disclosure.

FIG. 9 is a diagram illustrating an example 900 of using PRB portions, in accordance with the present disclosure. Example 900 shows constellation diagrams for transmitting modulated signals on PRBs.

UE 302 may transmit HARQ feedback based at least in part on a CS or constellation position of a PRB. For example, the multiple HARQ feedbacks may be conveyed from different CS locations on the PRB using PUCCH format 0. The set of CSs may be optimized for carrying multiple control bits (CGS) that span one PRB. Each of the first PRB and the second PRB (Z'=2 PRBs) shown in example 900 may be used to carry a 3-bit control sequence indicating an index l, where l∈{0, 3, 6, 9, 12, 15, 18, 21} and is defined to point to different CSs in respective PRBs. UE 302 may use an offset (offset K') in the equation of (K'+l) mod(Z' *Y') that is used for selecting a portion of a PSFCH resource for transmission. Example 300 shows 12 CSs (instead of 6 as in legacy systems) that are used to define the hashing space of Z' *Y' resources. UE 302 may use different K' offsets to convey the index in each PRB so as to avoid PSFCH resource collisions in the time-frequency domain.

As indicated above, FIG. 9 is provided as an example. Other examples may differ from what is described with regard to FIG. 9.

Figure 10:
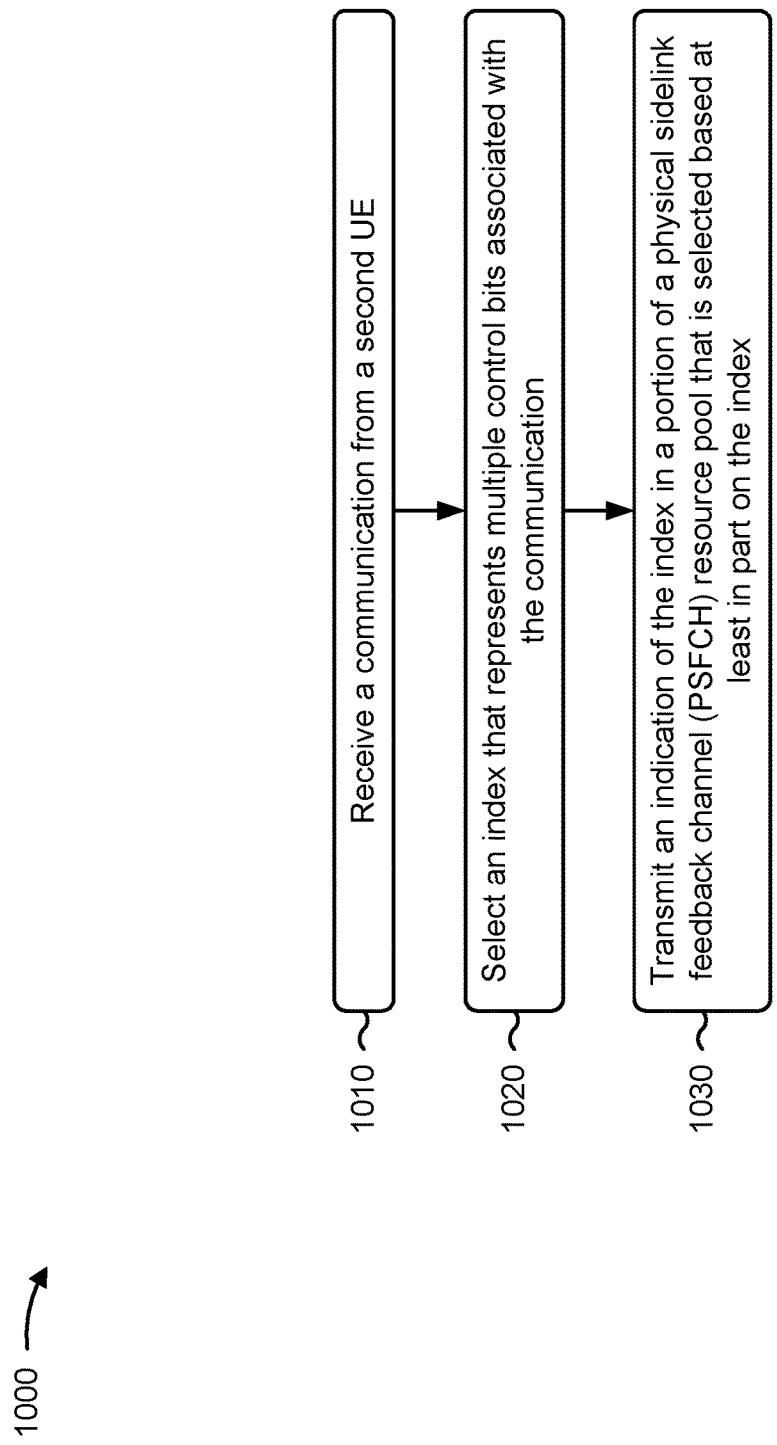
FIG. 10 is a diagram illustrating an example process performed, for example, by a first UE, in accordance with the present disclosure.

FIG. 10 is a diagram illustrating an example process 1000 performed, for example, by a first UE, in accordance with the present disclosure. Example process 1000 is an example where the UE (e.g., UE 120, UE 302) performs operations associated with using an index on a PSFCH to indicate multiple bits.

As shown in FIG. 10, in some aspects, process 1000 may include receiving a communication from a second UE (block 1010). For example, the UE (e.g., using communication manager 140 and/or reception component 1202 depicted in FIG. 12) may receive a communication from a second UE, as described above.

As further shown in FIG. 10, in some aspects, process 1000 may include selecting an index that represents multiple control bits associated with the communication (block 1020). For example, the UE (e.g., using communication manager 140 and/or selection component 1208 depicted in FIG. 12) may select an index that represents multiple control bits associated with the communication, as described above.

As further shown in FIG. 10, in some aspects, process 1000 may include transmitting an indication of the index in a portion of a PSFCH resource pool that is selected based at least in part on the index (block 1030). For example, the UE (e.g., using communication manager 140 and/or transmission component 1204 depicted in FIG. 12) may transmit an indication of the index in a portion of a PSFCH resource pool that is selected based at least in part on the index, as described above.

Process 1000 may include additional aspects, such as any single aspect or any combination of aspects described below and/or in connection with one or more other processes described elsewhere herein.

In a first aspect, the multiple control bits include a HARQ codeword.

In a second aspect, alone or in combination with the first aspect, the multiple control bits include at least two types of control information that are multiplexed.

In a third aspect, alone or in combination with one or more of the first and second aspects, the portion of the PSFCH includes a PRB.

In a fourth aspect, alone or in combination with one or more of the first through third aspects, the portion of the PSFCH further includes a CS for the PRB.

In a fifth aspect, alone or in combination with one or more of the first through fourth aspects, the portion of the PSFCH is based at least in part on a constellation offset.

In a sixth aspect, alone or in combination with one or more of the first through fifth aspects, process 1000 includes receiving the constellation offset from the second UE in SCI.

In a seventh aspect, alone or in combination with one or more of the first through sixth aspects, process 1000 includes receiving, from the second UE, SCI that indicates that the index for the multiple control bits is to be used.

In an eighth aspect, alone or in combination with one or more of the first through seventh aspects, the SCI indicates the PSFCH resource pool.

In a ninth aspect, alone or in combination with one or more of the first through eighth aspects, the SCI indicates the portion of the PSFCH resource pool.

In a tenth aspect, alone or in combination with one or more of the first through ninth aspects, the SCI includes a combination of control information without a HARQ response.

In an eleventh aspect, alone or in combination with one or more of the first through tenth aspects, transmitting the indication includes transmitting the indication according to a transmission pattern that is configured via RRC signaling.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
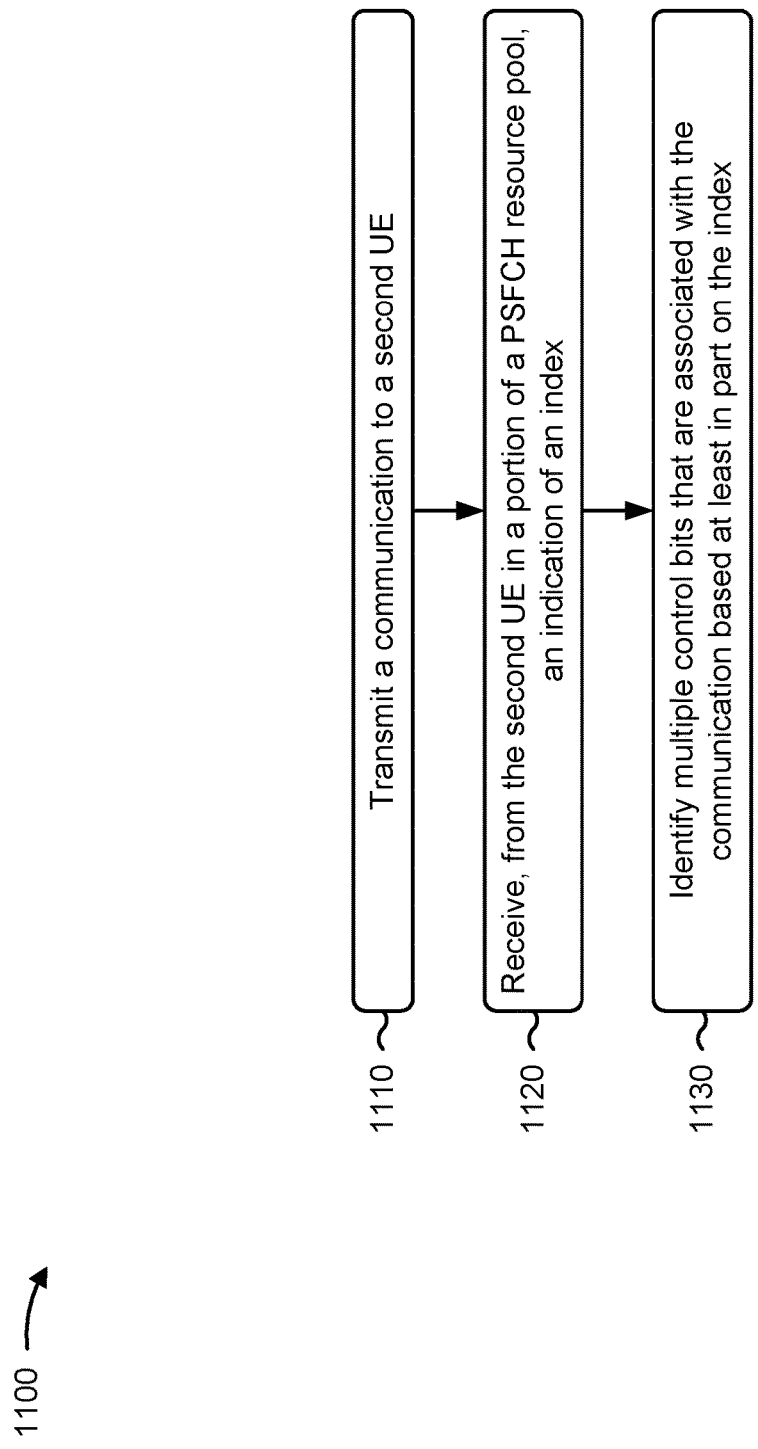
FIG. 11 is a diagram illustrating an example process performed, for example, by a first UE, in accordance with the present disclosure.

FIG. 11 is a diagram illustrating an example process 1100 performed, for example, by a UE, in accordance with the present disclosure. Example process 1100 is an example where the UE (e.g., UE 120, UE 304) performs operations associated with using an index on a PSFCH to indicate multiple bits. Note that the first UE of FIG. 11 may be the second UE described for FIG. 10. That is, FIG. 11 is a change of viewpoint from FIG. 10.

As shown in FIG. 11, in some aspects, process 1100 may include transmitting a communication to a second UE (block 1110). For example, the UE (e.g., using communication manager 140 and/or transmission component 1304 depicted in FIG. 13) may transmit a communication to a second UE, as described above.

As further shown in FIG. 11, in some aspects, process 1100 may include receiving, from the second UE in a portion of a PSFCH resource pool, an indication of an index (block 1120). For example, the UE (e.g., using communication manager 140 and/or reception component 1302 depicted in FIG. 13) may receive, from the second UE in a portion of a PSFCH resource pool, an indication of an index, as described above.

As further shown in FIG. 11, in some aspects, process 1100 may include identifying multiple control bits that are associated with the communication based at least in part on the index (block 1130). For example, the UE (e.g., using communication manager 140 and/or identification component 1308 depicted in FIG. 13) may identify multiple control bits that are associated with the communication based at least in part on the index, as described above.

Process 1100 may include additional aspects, such as any single aspect or any combination of aspects described below and/or in connection with one or more other processes described elsewhere herein.

In a first aspect, process 1100 includes transmitting another communication based at least in part on information indicated by the multiple control bits.

In a second aspect, alone or in combination with the first aspect, the multiple control bits include a HARQ codeword.

In a third aspect, alone or in combination with one or more of the first and second aspects, the multiple control bits include at least two types of control information that are multiplexed.

In a fourth aspect, alone or in combination with one or more of the first through third aspects, the portion of the PSFCH includes a PRB.

In a fifth aspect, alone or in combination with one or more of the first through fourth aspects, the portion of the PSFCH further includes a cyclic shift for the PRB.

In a sixth aspect, alone or in combination with one or more of the first through fifth aspects, the portion of the PSFCH is based at least in part on a constellation offset.

In a seventh aspect, alone or in combination with one or more of the first through sixth aspects, process 1100 includes transmitting the constellation offset to the second UE in SCI.

In an eighth aspect, alone or in combination with one or more of the first through seventh aspects, process 1100 includes, prior to transmitting the communication, transmitting SCI to the second UE that indicates that the index for the multiple control bits is to be used.

In a ninth aspect, alone or in combination with one or more of the first through eighth aspects, the SCI indicates the PSFCH resource pool.

In a tenth aspect, alone or in combination with one or more of the first through ninth aspects, the SCI indicates the portion of the PSFCH resource pool.

In an eleventh aspect, alone or in combination with one or more of the first through tenth aspects, the SCI includes a combination of control information without a HARQ response.

In a twelfth aspect, alone or in combination with one or more of the first through eleventh aspects, process 1100 includes transmitting the SCI to multiple UEs, where the SCI requests that indices for multiple control bits be transmitted by the multiple UEs over the same PRB.

In a thirteenth aspect, alone or in combination with one or more of the first through twelfth aspects, the SCI assigns a different portion of the PSFCH or a different constellation offset to each of the multiple UEs.

In a fourteenth aspect, alone or in combination with one or more of the first through thirteenth aspects, receiving the indication includes receiving the indication according to a transmission pattern that is configured via RRC signaling.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
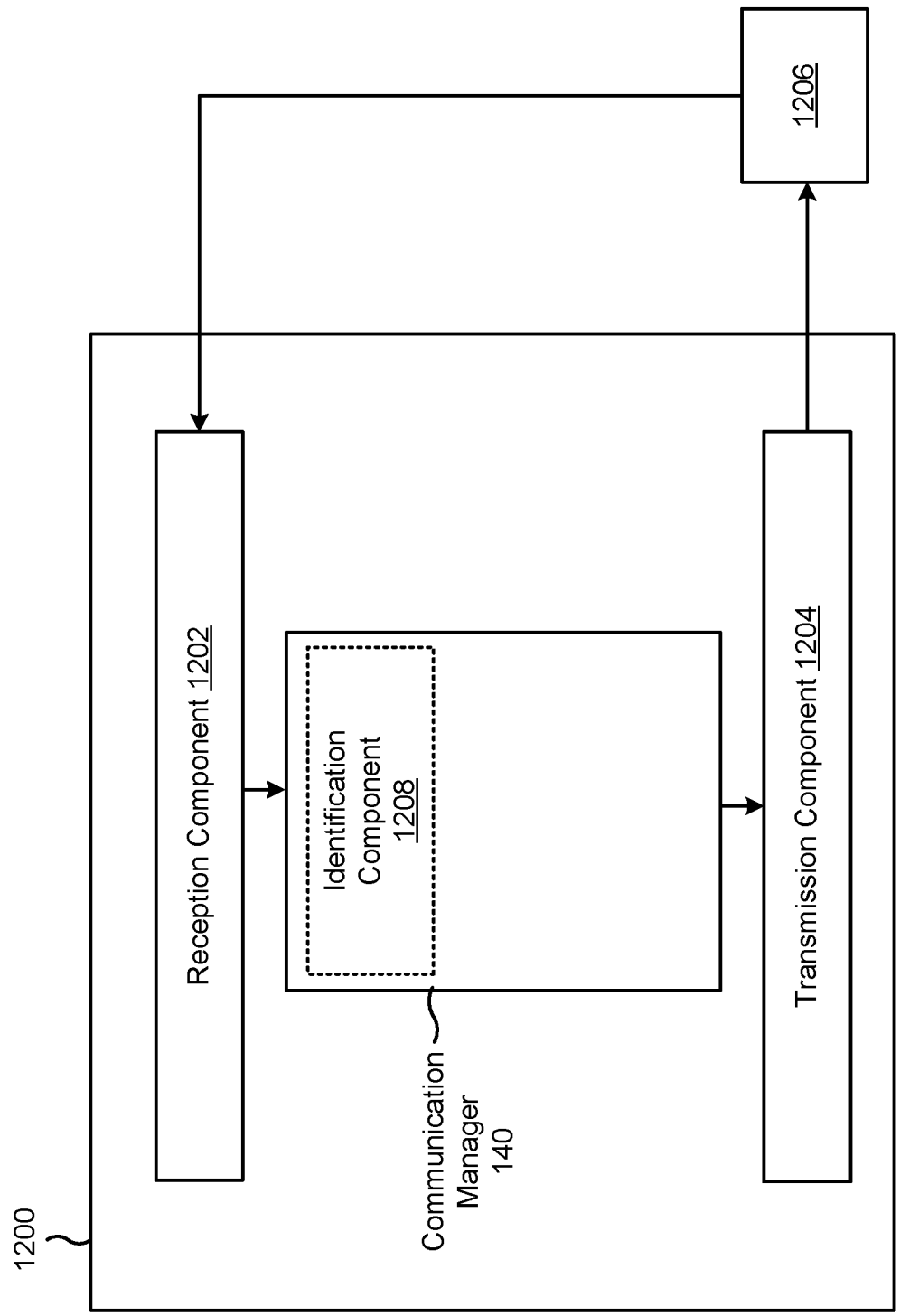
FIGS. 12-13 are block diagrams of example apparatuses for wireless communication, in accordance with the present disclosure.

FIG. 12 is a block diagram of an example apparatus 1200 for wireless communication. The apparatus 1200 may be a first UE, or a first UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a selection component 1208, among other examples.

In some aspects, the apparatus 1200 may be configured to perform one or more operations described herein in connection with FIGS. 1-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the first UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the first UE described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the first UE described in connection with FIG. 2. In some aspects, the transmission component 1204 may be co-located with the reception component 1202 in a transceiver.

The reception component 1202 may receive a communication from a second UE. The selection component 1208 may select an index that represents multiple control bits associated with the communication. The transmission component 1204 may transmit an indication of the index in a portion of a PSFCH resource pool that is selected based at least in part on the index.

The reception component 1202 may receive the constellation offset from the second UE in SCI. The reception component 1202 may receive, from the second UE, SCI that indicates that the index for the multiple control bits is to be used.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
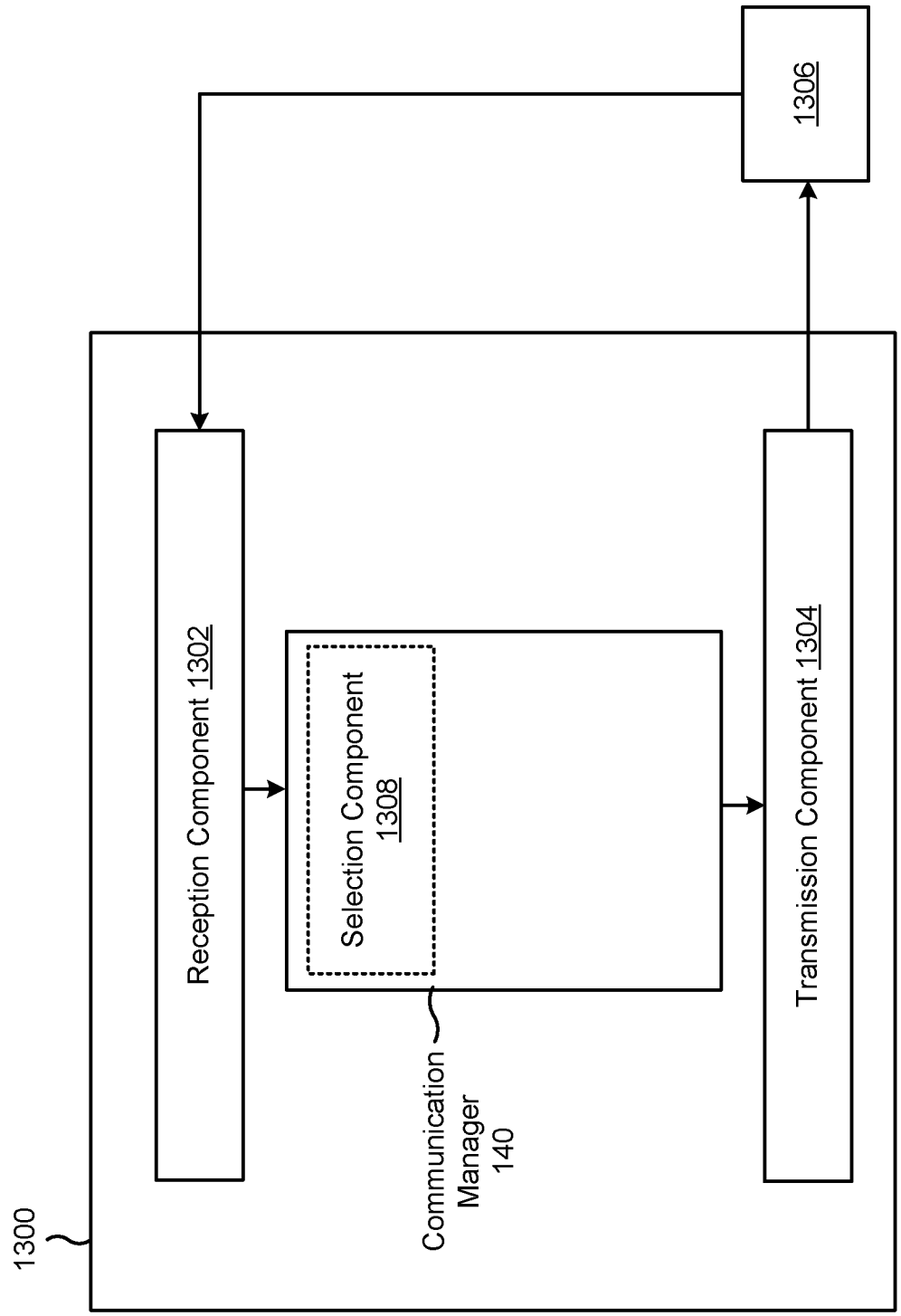

FIG. 13 is a block diagram of an example apparatus 1300 for wireless communication. The apparatus 1300 may be a first UE, or a first UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include an identification component 1308, among other examples.

In some aspects, the apparatus 1300 may be configured to perform one or more operations described herein in connection with FIGS. 1-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the first UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the first UE described in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the first UE described in connection with FIG. 2. In some aspects, the transmission component 1304 may be co-located with the reception component 1302 in a transceiver.

The transmission component 1304 may transmit a communication to a second UE. The reception component 1302 may receive, from the second UE in a portion of a PSFCH resource pool, an indication of an index. The identification component 1308 may identify multiple control bits that are associated with the communication based at least in part on the index.

The transmission component 1304 may transmit another communication based at least in part on information indicated by the multiple control bits. The transmission component 1304 may transmit the constellation offset to the second UE in SCI. The transmission component 1304 may transmit the SCI to multiple UEs, where the SCI requests that indices for multiple control bits be transmitted by the multiple UEs over the same PRB.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first user equipment (UE), comprising: receiving a communication from a second UE; selecting an index that represents multiple control bits associated with the communication; and transmitting an indication of the index in a portion of a physical sidelink feedback channel (PSFCH) resource pool that is selected based at least in part on the index.

Aspect 2: The method of Aspect 1, wherein the multiple control bits include a hybrid automatic repeat request (HARQ) codeword.

Aspect 3: The method of Aspect 1 or 2, wherein the multiple control bits include at least two types of control information that are multiplexed.

Aspect 4: The method of any of Aspects 1-3, wherein the portion of the PSFCH includes a physical resource block (PRB).

Aspect 5: The method of Aspect 4, wherein the portion of the PSFCH further includes a cyclic shift for the PRB.

Aspect 6: The method of any of Aspects 1-5, wherein the portion of the PSFCH is based at least in part on a constellation offset.

Aspect 7: The method of Aspect 6, further comprising receiving the constellation offset from the second UE in sidelink control information.

Aspect 8: The method of Aspect 1, further comprising receiving, from the second UE, sidelink control information (SCI) that indicates that the index for the multiple control bits is to be used.

Aspect 9: The method of Aspect 8, wherein the SCI indicates the PSFCH resource pool.

Aspect 10: The method of Aspect 8 or 9, wherein the SCI indicates the portion of the PSFCH resource pool.

Aspect 11: The method of any of Aspects 8-10, wherein the SCI includes a combination of control information without a hybrid automatic repeat request response.

Aspect 12: The method of any of Aspects 1-11, wherein transmitting the indication includes transmitting the indication according to a transmission pattern that is configured via radio resource control signaling.

Aspect 13: A method of wireless communication performed by a first user equipment (UE), comprising: transmitting a communication to a second UE; receiving, from the second UE in a portion of a physical sidelink feedback channel (PSFCH) resource pool, an indication of an index; and identifying multiple control bits that are associated with the communication based at least in part on the index.

Aspect 14: The method of Aspect 13, further comprising transmitting another communication based at least in part on information indicated by the multiple control bits.

Aspect 15: The method of Aspect 13 or 14, wherein the multiple control bits include a hybrid automatic repeat request (HARQ) codeword.

Aspect 16: The method of any of Aspects 13-15, wherein the multiple control bits include at least two types of control information that are multiplexed.

Aspect 17: The method of any of Aspects 13-16, wherein the portion of the PSFCH includes a physical resource block (PRB).

Aspect 18: The method of Aspect 17, wherein the portion of the PSFCH further includes a cyclic shift for the PRB.

Aspect 19: The method of any of Aspects 13-18, wherein the portion of the PSFCH is based at least in part on a constellation offset.

Aspect 20: The method of Aspect 19, further comprising transmitting the constellation offset to the second UE in sidelink control information.

Aspect 21: The method of any of Aspects 13-20, further comprising, prior to transmitting the communication, transmitting sidelink control information (SCI) to the second UE that indicates that the index for the multiple control bits is to be used.

Aspect 22: The method of Aspect 21, wherein the SCI indicates the PSFCH resource pool.

Aspect 23: The method of Aspect 21 or 22, wherein the SCI indicates the portion of the PSFCH resource pool.

Aspect 24: The method of any of Aspects 21-23, wherein the SCI includes a combination of control information without a hybrid automatic repeat request response.

Aspect 25: The method of any of Aspects 21-24, further comprising transmitting the SCI to multiple UEs, wherein the SCI requests that indices for multiple control bits be transmitted by the multiple UEs over the same physical resource block.

Aspect 26: The method of Aspect 25, wherein the SCI assigns a different portion of the PSFCH or a different constellation offset to each of the multiple UEs.

Aspect 27: The method of any of Aspects 13-26, wherein receiving the indication includes receiving the indication according to a transmission pattern that is configured via radio resource control signaling.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description, but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only, and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   memory; and
   one or more processors, coupled to the memory, configured to:
      receive a communication from a second UE;
      select an index that maps to a sequence of bit values that includes multiple control bits indicating feedback corresponding to the communication; and
      transmit an indication of the index using index modulation to represent the multiple control bits via the index,
         wherein the index modulation indicates a value of the index using a resource index of a physical sidelink feedback channel (PSFCH), and
         wherein a resource pool of the PSFCH is selected using the index.

2. The first UE of claim 1, wherein the multiple control bits include a hybrid automatic repeat request (HARQ) codeword.

3. The first UE of claim 1, wherein the multiple control bits include at least two types of control information that are multiplexed.

4. The first UE of claim 1, wherein a portion of the PSFCH in which the indication of the index is transmitted includes a physical resource block (PRB).

5. The first UE of claim 4, wherein the portion of the PSFCH further includes a cyclic shift for the PRB.

6. The first UE of claim 1, wherein a portion of the PSFCH in which the indication of the index is transmitted is based at least in part on a constellation offset.

7. The first UE of claim 6, wherein the one or more processors are configured to receive the constellation offset from the second UE in sidelink control information.

8. The first UE of claim 1, wherein the one or more processors are configured to receive, from the second UE, sidelink control information (SCI) that indicates that the index for the multiple control bits is to be used.

9. The first UE of claim 8, wherein the SCI indicates the PSFCH resource pool.

10. The first UE of claim 8, wherein the SCI indicates a portion of the PSFCH in which the indication of the index is transmitted.

11. The first UE of claim 8, wherein the SCI includes a combination of control information without a hybrid automatic repeat request response.

12. The first UE of claim 1, wherein the one or more processors, to transmit the indication, are configured to transmit the indication according to a transmission pattern that is configured via radio resource control signaling.

13. A first user equipment (UE) for wireless communication, comprising:
   memory; and
   one or more processors, coupled to the memory, configured to:
      transmit a communication to a second UE;
      receive, from the second UE in a portion of a physical sidelink feedback channel (PSFCH) resource pool, an indication of an index using index modulation that represents multiple control bits via the index,
         wherein the index modulation indicates a value of the index using a resource index of the PSFCH, and
         wherein the index maps to a sequence of bit values that includes the multiple control bits; and
      identify, using the index and the mapping, the multiple control bits, wherein the multiple control bits indicate feedback corresponding to the communication based at least in part on the index and the mapping.

14. The first UE of claim 13, wherein the one or more processors are configured to transmit another communication based at least in part on information indicated by the multiple control bits.

15. The first UE of claim 13, wherein the multiple control bits include a hybrid automatic repeat request (HARQ) codeword.

16. The first UE of claim 13, wherein the multiple control bits include at least two types of control information that are multiplexed.

17. The first UE of claim 13, wherein a portion of the PSFCH in which the indication of the index is transmitted is based at least in part on a constellation offset.

18. The first UE of claim 17, wherein the one or more processors are configured to transmit the constellation offset to the second UE in sidelink control information.

19. The first UE of claim 13, wherein the one or more processors are configured to, prior to transmitting the communication, transmitting sidelink control information (SCI) to the second UE that indicates that the index for the multiple control bits is to be used.

20. The first UE of claim 19, wherein the SCI indicates the PSFCH resource pool.

21. The first UE of claim 19, wherein the SCI indicates the portion of the PSFCH resource pool.

22. The first UE of claim 19, wherein the SCI includes a combination of control information without a hybrid automatic repeat request response.

23. The first UE of claim 19, wherein the one or more processors are configured to transmit the SCI to multiple UEs, wherein the SCI requests that indices for multiple control bits be transmitted by the multiple UEs over the same physical resource block.

24. The first UE of claim 23, wherein the SCI assigns a different portion of the PSFCH or a different constellation offset to each of the multiple UEs.

25. The first UE of claim 13, wherein the one or more processors, to receive the indication, are configured to receive the indication according to a transmission pattern that is configured via radio resource control signaling.

26. A method of wireless communication performed by a first user equipment (UE), comprising:
receiving a communication from a second UE;
selecting an index that maps to a sequence of bit values that includes multiple control bits indicating feedback corresponding to the communication; and
transmitting an indication of the index using index modulation to represent the multiple control bits via the index,
wherein the index modulation indicates a value of the index using a resource index of a physical sidelink feedback channel (PSFCH), and
wherein a resource pool of the PSFCH is selected using the index.

27. A method of wireless communication performed by a first user equipment (UE), comprising:
transmitting a communication to a second UE;
receiving, from the second UE in a portion of a physical sidelink feedback channel (PSFCH) resource pool, an indication of an index using index modulation that represents multiple control bits via the index,
wherein the index modulation indicates a value of the index using a resource index of the PSFCH, and
wherein the index maps to a sequence of bit values that includes the multiple control bits; and
identifying, using the index and the mapping, the multiple control bits,
wherein the multiple control bits indicate feedback corresponding to the communication.

28. The method of claim 26, wherein the multiple control bits include a hybrid automatic repeat request (HARQ) codeword.

29. The method of claim 27, wherein the multiple control bits include a hybrid automatic repeat request (HARQ) codeword.

* * * * *